(12) United States Patent
Liebinger Portela et al.

(10) Patent No.: US 11,159,376 B2
(45) Date of Patent: Oct. 26, 2021

(54) SYSTEM AND METHOD FOR NETWORK INFRASTRUCTURE ANALYSIS AND CONVERGENCE

(71) Applicant: International Business Machines Corporation, Armonk, NY (US)

(72) Inventors: Franz F. Liebinger Portela, Heredia (CR); Ricardo Golcher Ugalde, San Jose (CR); Carlos Gustavo Alfaro Briceno, Heredia (CR); Edgar A. Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 15/988,339

(22) Filed: May 24, 2018

(65) Prior Publication Data
US 2019/0363938 A1    Nov. 28, 2019

(51) Int. Cl.
*H04L 12/24* (2006.01)
*H04L 9/32* (2006.01)
*H04L 29/06* (2006.01)

(52) U.S. Cl.
CPC ........ *H04L 41/0859* (2013.01); *H04L 9/3236* (2013.01); *H04L 41/12* (2013.01); *H04L 63/0263* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 6,202,114 B1 | 3/2001 | Dutt et al. | |
| 7,606,170 B2 * | 10/2009 | Fischer | H04L 41/0253 370/254 |
| 10,212,034 B1 * | 2/2019 | Carranza Giotto | H04L 41/0816 |
| 10,250,694 B2 * | 4/2019 | Mankovskii | H04L 67/142 |
| 10,326,888 B1 * | 6/2019 | Miskovic | H04M 7/0075 |
| 10,860,978 B1 * | 12/2020 | Aggarwal | G06Q 10/0875 |
| 2003/0204750 A1 * | 10/2003 | Ng | H04N 21/4108 726/22 |

(Continued)

OTHER PUBLICATIONS

Unknown, "Convergence", Wikipedia, https://en.wikipedia.org/wiki/Convergence, Dec. 5, 2017, 3 pgs.

*Primary Examiner* — Christopher T Wyllie
(74) *Attorney, Agent, or Firm* — William H. Hartwell; Maxine L. Barasch; Keohane & D'Alessandro, PLLC

(57) ABSTRACT

Disclosed embodiments provide techniques for computer networks infrastructure automatic convergence. The network devices are enabled to communicate with other adjacent network devices, independently of the device type, about detected changes that could affect them and together generate consensus utilizing a blockchain mechanism about the configuration changes that are accepted. A priority table specifies a priority for various device classes on a network. The devices, in response to a new network topology, determine if a new device configuration is necessary. When a new device configuration is necessary, data corresponding to the new device configuration is put into a blockchain block and appended to a network blockchain that is maintained by one or more nodes (devices) on the network. In this way, an immutable history of network configurations is maintained, improving network security and reliability.

17 Claims, 9 Drawing Sheets

(56) References Cited

U.S. PATENT DOCUMENTS

| | | | |
|---|---|---|---|
| 2005/0068919 A1* | 3/2005 | Pedlar | H04L 45/00 370/329 |
| 2005/0071094 A1* | 3/2005 | Quelch | H02J 9/061 702/60 |
| 2006/0176819 A1* | 8/2006 | Charzinski | H04L 45/12 370/238 |
| 2006/0198370 A1* | 9/2006 | Haddad | H04W 8/087 370/389 |
| 2012/0147733 A1 | 6/2012 | Wang | |
| 2014/0342716 A1* | 11/2014 | Harris | H04W 4/12 455/418 |
| 2017/0134224 A1 | 5/2017 | Korkalo | |
| 2017/0201453 A1 | 7/2017 | Deng | |
| 2017/0206382 A1* | 7/2017 | Rodriguez De Castro | H04L 9/3239 |
| 2017/0308408 A1* | 10/2017 | Goyal | G06F 9/5077 |
| 2017/0346693 A1* | 11/2017 | Dix | H04L 9/3265 |
| 2018/0068091 A1* | 3/2018 | Gaidar | G06F 21/16 |
| 2018/0082024 A1* | 3/2018 | Curbera | H04L 9/0637 |
| 2018/0139278 A1* | 5/2018 | Bathen | H04L 9/3236 |
| 2018/0167198 A1* | 6/2018 | Muller | G06F 21/44 |
| 2018/0176229 A1* | 6/2018 | Bathen | H04W 12/106 |
| 2018/0191714 A1* | 7/2018 | Jentzsch | H04L 63/126 |
| 2018/0307959 A1* | 10/2018 | Pigott | G06K 19/0723 |
| 2018/0337847 A1* | 11/2018 | Li | H04L 67/1029 |
| 2019/0034465 A1* | 1/2019 | Shimamura | H04L 9/3239 |
| 2019/0079950 A1* | 3/2019 | Ramabaja | G06F 16/1805 |
| 2019/0109717 A1* | 4/2019 | Reddy | H04L 9/0643 |
| 2019/0149418 A1* | 5/2019 | Bertsche | G06F 9/445 707/625 |
| 2019/0188086 A1* | 6/2019 | Maeda | G06F 11/1453 |
| 2019/0295336 A1* | 9/2019 | Jones | G07C 5/085 |
| 2019/0306232 A1* | 10/2019 | Brock | H04L 67/1048 |
| 2019/0320014 A1* | 10/2019 | Allen | H04L 67/104 |
| 2019/0334920 A1* | 10/2019 | Kelly | H04L 9/3239 |
| 2019/0342162 A1* | 11/2019 | Bendre | H04L 41/0813 |
| 2019/0363938 A1* | 11/2019 | Liebinger Portela | H04L 41/12 |

\* cited by examiner

| PRIORITY | DEVICE | DEVICE |
|---|---|---|
| 1 | FIREWALL | |
| 2 | ROUTER | LOAD BALANCER |
| 3 | SWITCH | HYPERVISOR |
| 4 | IP PHONE | |
| 5 | SERVER | |
| 6 | HOST | |

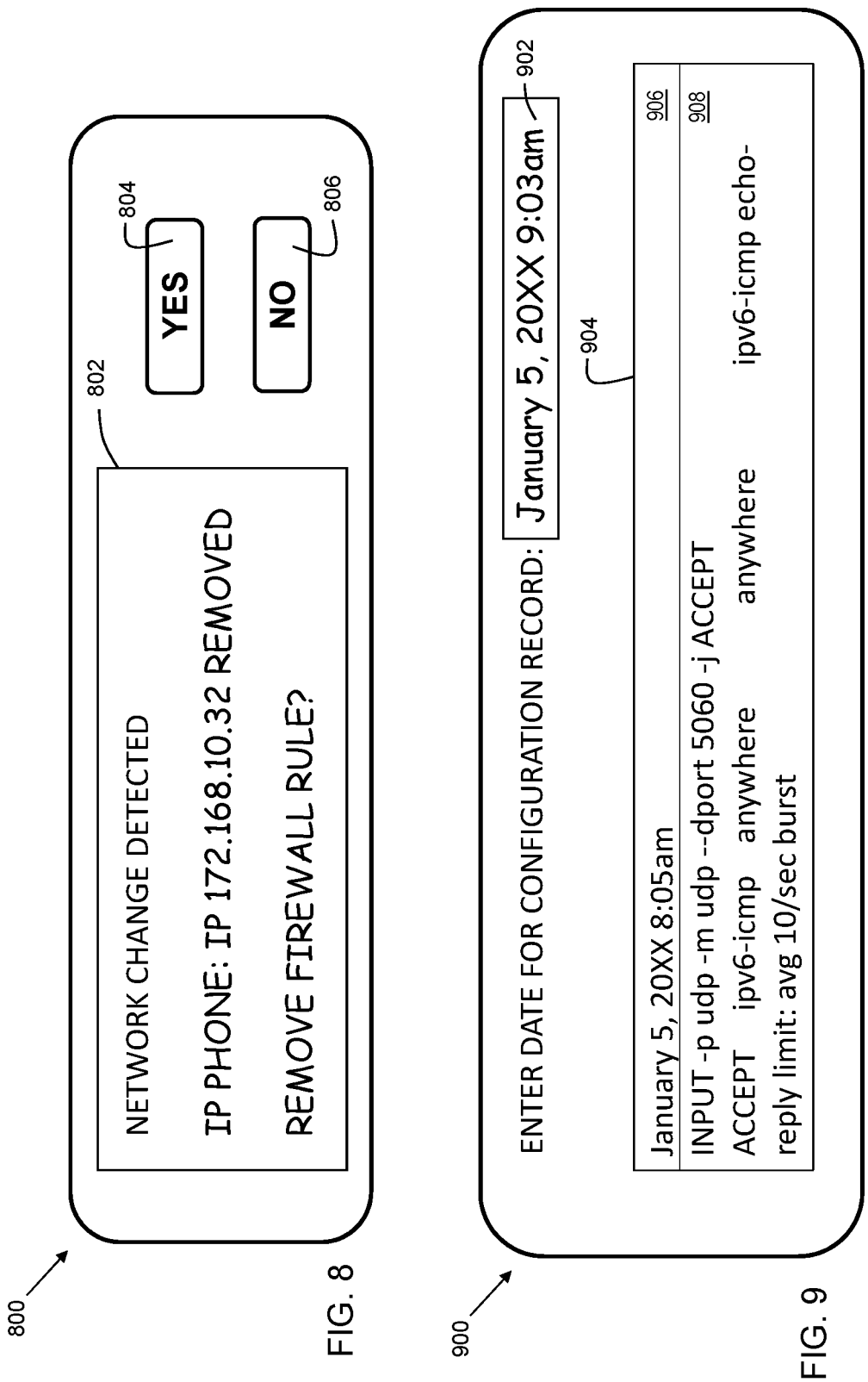

SYSTEM AND METHOD FOR NETWORK INFRASTRUCTURE ANALYSIS AND CONVERGENCE

FIELD OF THE INVENTION

The present invention relates generally to computer networks, and more particularly to systems and methods for network infrastructure analysis and convergence.

BACKGROUND

Networks include many different devices interconnected with one another for data transmission and process implementation. The configuration of a network device may be changed by adding, removing, or updating, etc., a connected device (node). It is necessary to analyze how this change will impact the entire network, since the device is not isolated and its change could affect other adjacent network devices. It is therefore desirable to have improvements in network infrastructure analysis and convergence to improve reliability and security of computer networks.

SUMMARY

In one embodiment, there is provided a computer-implemented method for network convergence, comprising: detecting a network topology change; determining if a new configuration is required due to the network topology change; in response to determining that a new configuration is required, creating a blockchain block, wherein the blockchain block contains the new configuration; and adding the blockchain block to a network blockchain.

In another embodiment, there is provided an electronic computing device comprising: a processor; a memory coupled to the processor, the memory containing instructions, that when executed by the processor, perform the steps of: detecting a network topology change; determining if a new configuration is required due to the network topology change; in response to determining that a new configuration is required, creating a blockchain block, wherein the blockchain block contains the new configuration; and adding the blockchain block to a network blockchain.

In yet another embodiment, there is provided a computer program product for an electronic computing device comprising a computer readable storage medium having program instructions embodied therewith, the program instructions executable by a processor to cause the electronic computing device to: detect a network topology change; determine if a new configuration is required due to the network topology change; in response to determining that a new configuration is required, creating a blockchain block, wherein the blockchain block contains the new configuration; and adding the blockchain block to a network blockchain.

BRIEF DESCRIPTION OF THE DRAWINGS

Features of the disclosed embodiments will be more readily understood from the following detailed description of the various aspects of the invention taken in conjunction with the accompanying drawings.

FIG. 8 shows an exemplary user confirmation interface in accordance with embodiments of the present invention.

FIG. 9 shows an example of a forensic record retrieval in accordance with embodiments of the present invention.

Figure 1A:
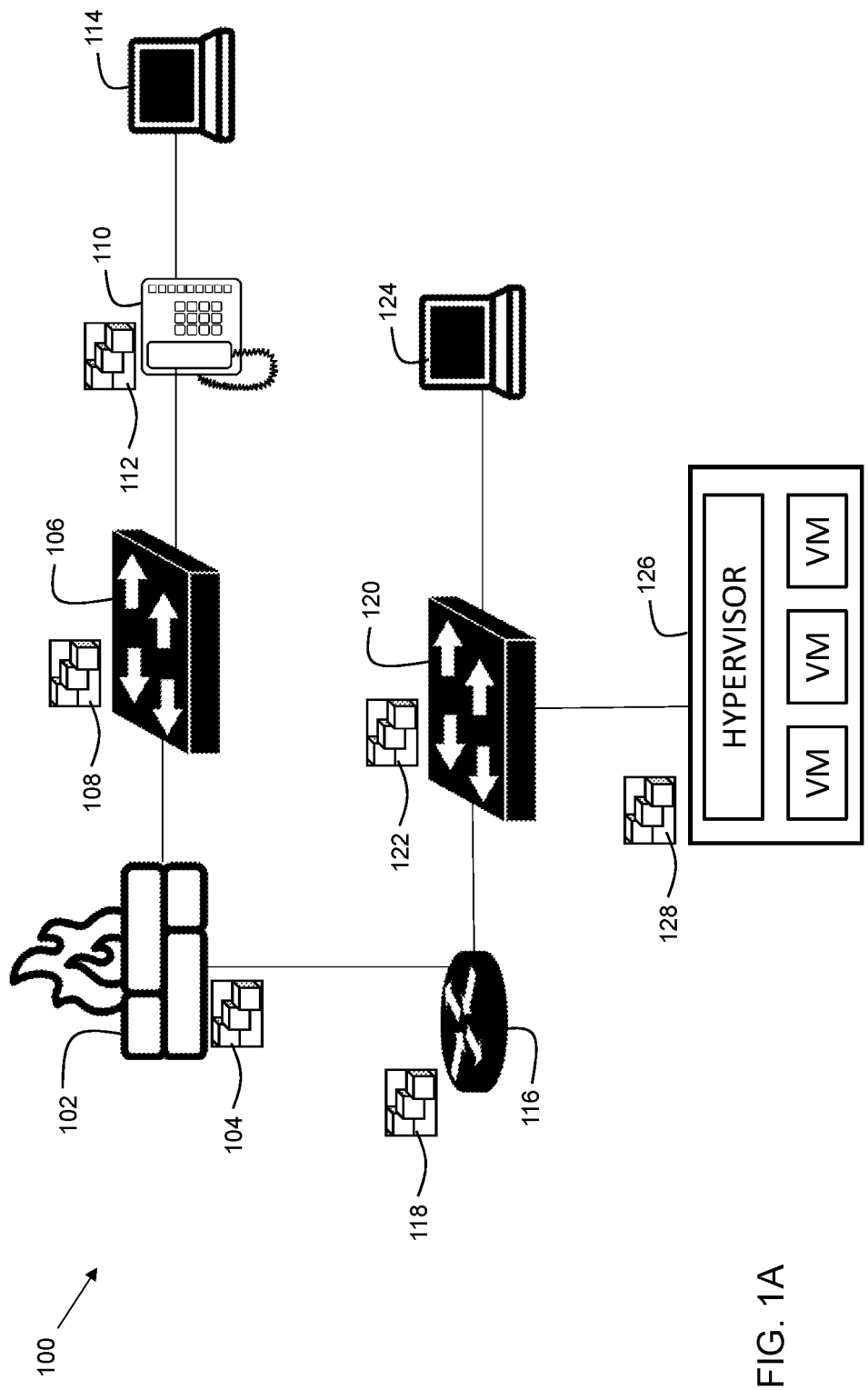
FIG. 1A shows an exemplary network including embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for computer networks infrastructure automatic convergence. The network devices are enabled to communicate with other adjacent network devices, independently of the device type, about detected changes that could affect them and together generate consensus utilizing a blockchain mechanism about the configuration changes that are accepted. A priority table specifies a priority for various device classes on a network. The devices, in response to a new network topology, determine if a new device configuration is necessary. When a new device configuration is necessary, data corresponding to the new device configuration is put into a blockchain block and appended to a network blockchain that is maintained by one or more nodes (devices) on the network. In this way, an immutable history of network configurations is maintained, improving network security and reliability.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1A shows an exemplary network 100 of a blockchain community including embodiments of the present invention. As shown, there may be many devices connected through the network. A firewall 102 is included, as well as a router 116. There are two computers 114 and 124. These computers may be laptop, desktop, tablet, or any other type of computer. An IP phone 110 is included. There are two switches 106 and 120. A cloud server 126 having several virtual machines and a hypervisor thereon is present.

Firewall 102 links the enterprise to the outside world. Computer 114 is linked to phone 110, which is linked through switch 106 to the firewall 102. Computer 124 and cloud server 126 are linked to switch 120 and linked to firewall 102 through router 116.

The diagram shows how the network components correspond to a blockchain. The phone 110 maintains instance 112 of the network blockchain in memory located within the phone. Switch 106 maintains instance 108 of the network blockchain in memory located within the switch. Similarly, switch 120 maintains instance 122 of the network blockchain in memory located within the switch. Cloud server 126 maintains instance 128 of the network blockchain in memory located within the cloud server. In embodiments, the cloud server may include a hypervisor and multiple virtual machine (VM) instances. Firewall 102 maintains instance 104 of the network blockchain in memory located within the firewall, and router 116 maintains instance 118 of the network blockchain in memory located within the router. Note that computer 114 and computer 124 do not maintain a blockchain instance. In embodiments, it is not required for each network device to maintain a blockchain instance. Consensus can be achieved with the network nodes that participate in the blockchain, while nodes that do not participate in the blockchain do not participate in the consensus process but can still be a part of the network. In this way, a variety of devices can be utilized in networks with disclosed embodiments.

Figure 1B:
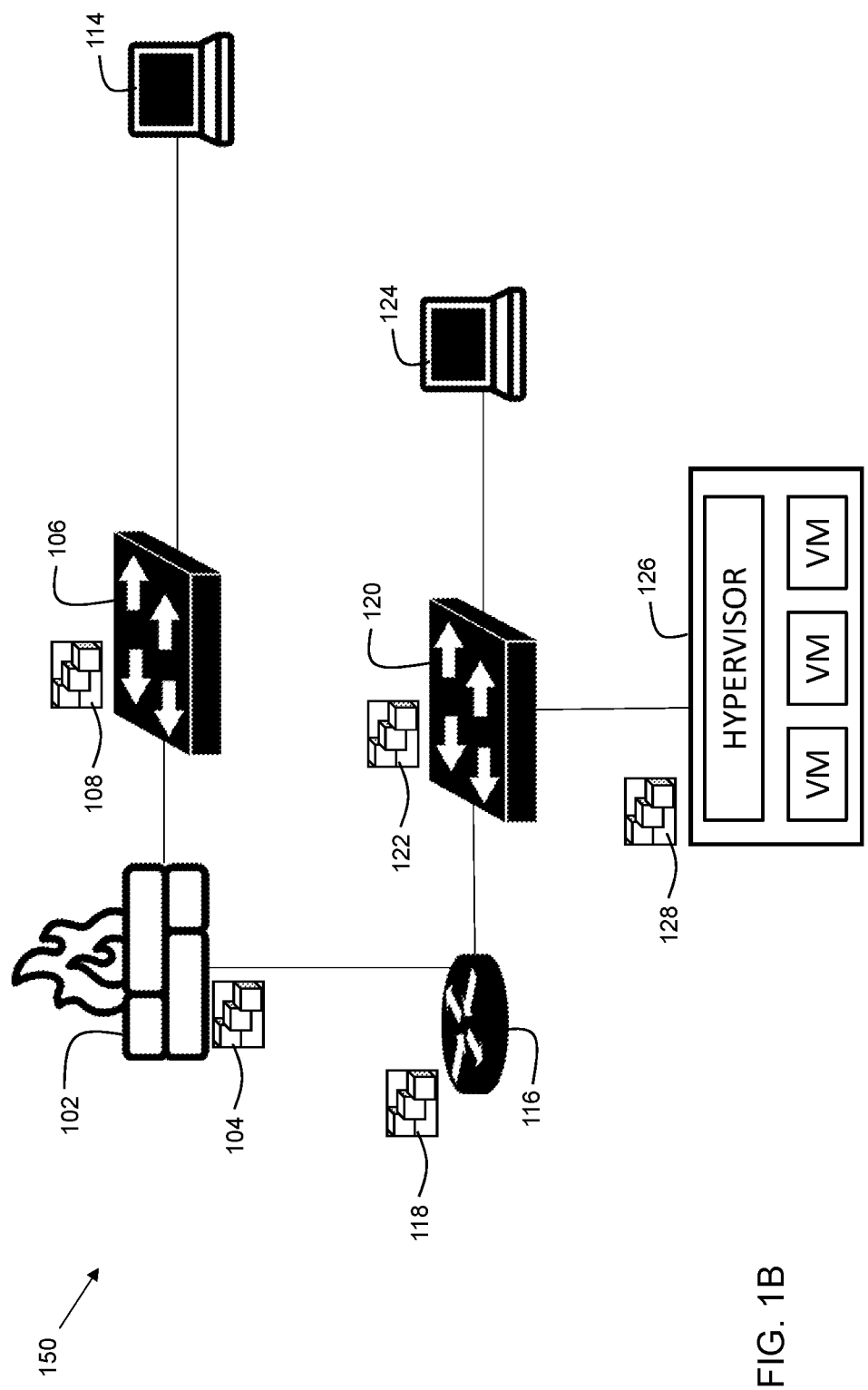
FIG. 1B shows the network of FIG. 1A after a network topology change.

FIG. 1B shows network 150, which represents network 100 of FIG. 1A after a network topology change. Following initial configuration of a network, as shown in FIG. 1A, one of the devices in the network may be removed. In this case, the IP phone 110, connected to computer 114, is removed. The switch 106, to which the phone 110 was connected, will detect the network topology change. This triggers transmission of a notification to peer network devices (for example, switch 120, router 116, and cloud server 126). In embodiments, the notification may be conveyed via SNMP, TR069, or other suitable protocol. Each of these devices analyzes how the network topology change impacts its configuration. The effect, if any, depends on the device types and enabled services accessing the missing parts of the network.

Figure 2:
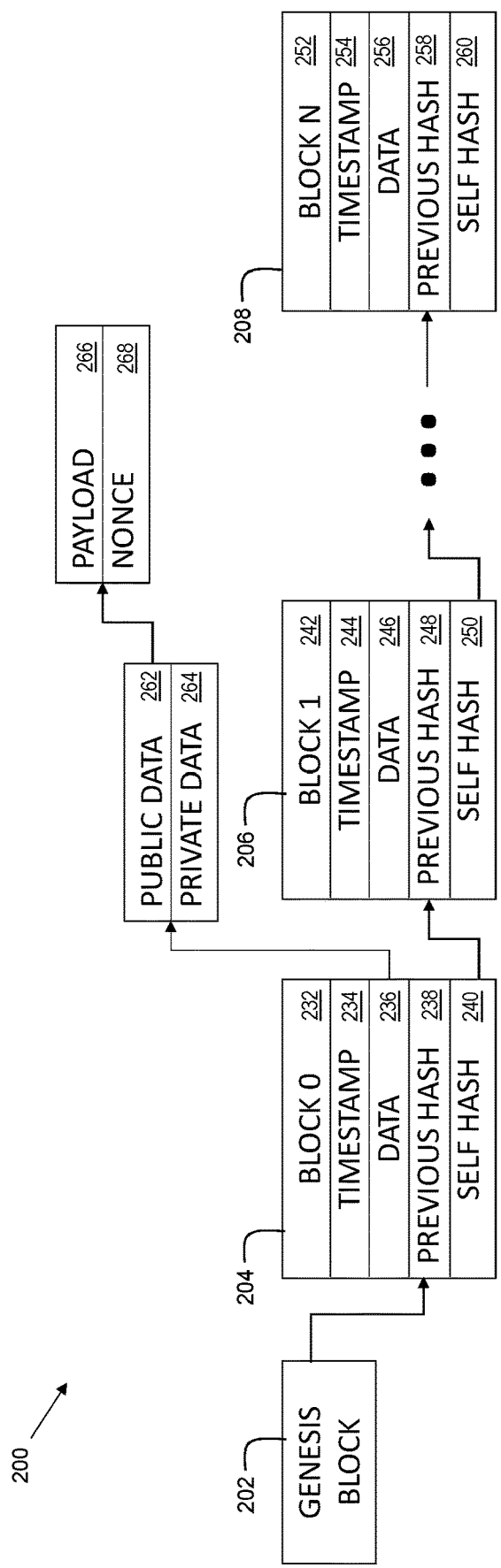
FIG. 2 shows an example blockchain used in accordance with embodiments of the present invention.

FIG. 2 shows an example blockchain 200 used in accordance with embodiments of the present invention. A blockchain is a decentralized continuously developing list of records, named blocks, which are linked and secured via cryptography. Each block usually includes a cryptographic hash of the previous block, a timestamp, and transaction data. A blockchain is inherently impervious to alteration of the data. The blockchain is an open, distributed ledger that can record transactions between multiple parties. The blockchain achieves this efficiently and in a verifiable and enduring way. As a distributed ledger, a blockchain is normally managed by a peer-to-peer network collectively following a protocol for validating new blocks. After recordation, the data in any particular block cannot be modified retroactively without the modification of all subsequent blocks, which necessitates complicity of the network majority.

At 202, there is the genesis block (the initial block in the blockchain). The genesis block is used as the previous block for Block 0 204. Such block includes a field for block identifier (Block 0) 232, a field for a timestamp 234, a data field 236, a previous hash 238, and a self hash 240.

The first self hash is computed for the Block 0 utilizing the transactions inside such block. For each additional block that is generated subsequently, the previous block's hash is also used, as well as its own transactions, as input to determine its block hash. This is how a chain of blocks (the "blockchain") is created, with each block hash pointing to the block hash that originated prior to it. This system assures that no transaction in the chain can be altered later, since if any portion of the transaction is modified, the hash of the block to which it belongs is modified, as well as any following blocks' hashes. This makes it relatively likely that any tampering would be noticed, since a check, via a comparison of the hashes, would reveal the discrepancy.

Accordingly, in the blocks that follow the genesis block, the "previous hash" value must match the "self hash" value of the previous block. For example, previous hash 248 of Block 1 (206) must match the self hash 240 of Block 0 (204).

Referring again to block 202, the data field 236 contains public data 262, and may optionally include private data 264. The private data can be used to allow authentication of a configuration via the blockchain, without revealing the actual contents of the data. As an example, in embodiments of the present invention, a firewall may encrypt at least a portion of its configuration. For example, if a particular port range is open, that rule can be encrypted in the blockchain data. When that block is shared with other devices in the network topology, those devices cannot directly read the configuration data. However, using the hashes within the blockchain, it can be confirmed that the data is authentic.

Public data field 262 contains a field 266 for payload, and optionally a field 268 for a nonce. Embodiments may include appending a nonce to data corresponding to the new configuration prior to creating the blockchain block. In embodiments, the nonce is selected such that a hash value for the blockchain block is below a predetermined value. This can be done to slow down an attempt to forge a blockchain copy. Finding a nonce that results in a hash that is below a maximum value requires computation cycles, which effectively governs or limits the speed at which new blocks can be added to the blockchain. This can be advantageous for security purposes in certain applications, as it limits how fast a malicious process could add blocks to the blockchain. The nonce mechanism is used to implement a Proof-of-Work (PoW) consensus protocol. However, other consensus protocols may be used in some embodiments. For example, a Proof-of-elapsed-Time (PoeT) consensus algorithm may be used to limit the rate at which blocks can be added to the blockchain. These consensus algorithms are intended to preserve blockchain integrity and prevent forking of the blockchain.

Block 204 references block 206 (Block 1). Previous hash 248 is the same value as self hash 240 of the previous block. Block 206 includes a field for block identifier (Block 1) 242, a field 244 for a timestamp, a field 246 for data, a previous hash 248, and a field 250 for a self hash. There can be many more blocks in the blockchain. The blockchain accordingly continues on to block 208, which is indicated as Block N. Block 208 includes a field for block identifier (Block N) 252, a field 254 for a timestamp, a field 256 for data, a field 258 for a previous hash, and a field 260 for its self hash. To be considered valid, each value for "previous hash" must represent the value of "self hash" for the preceding block in the blockchain.

Figure 3A:
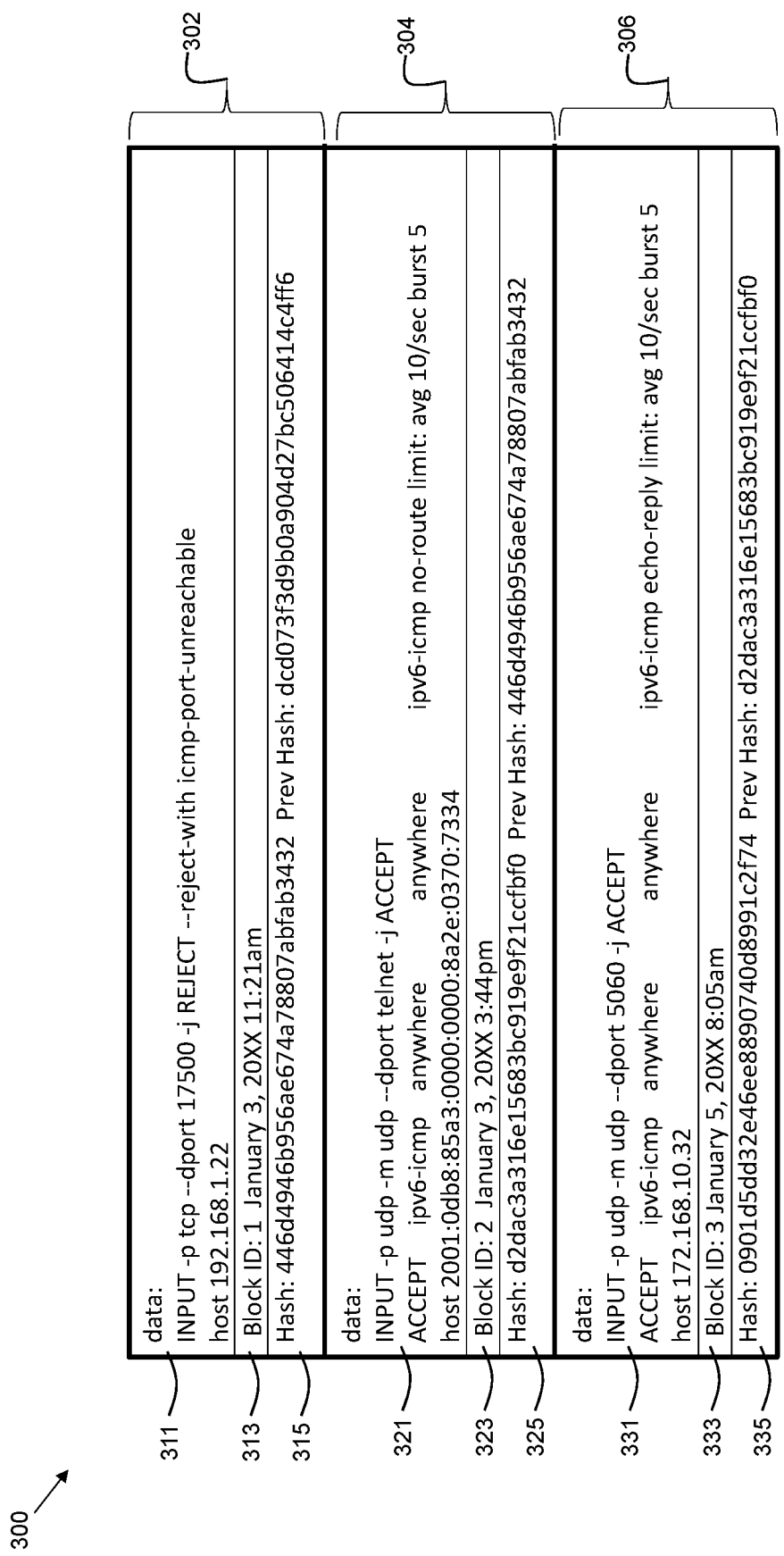
FIG. 3A shows exemplary blockchain data before a network topology change.

FIG. 3A shows exemplary blockchain information 300 before a network topology change. This blockchain data may include configuration data for the firewall (102 of FIG. 1A). Three blocks are represented—blocks 302, 304, and 306. Block 302 includes data 311. Block 302 also includes a block identifier (ID) and timestamp at 313. The timestamps can be used for forensic purposes, to retrieve a block corresponding to a particular point in time. Block 302 further includes a hash block 315 which contains a self hash and a previous hash. Data 311 shows an exemplary firewall rule. Block 304 includes data 321. Data 321 represents a subsequent configuration change of the firewall 102. Block 304 also includes a block ID and timestamp at 323. Block 304 further includes a hash block 325 which contains a self hash and a previous hash. Block 306 includes data 331. Block 306 also includes a block ID and timestamp at 333. Block 306 further includes a hash block 335 which contains a self hash and a previous hash. The firewall rule indicated in data 331 represents the current configuration of the firewall 102. Note that while only a few firewall rules are shown in FIG. 3A, in practice each configuration record may contain many firewall rules, and/or other configuration information.

Figure 3B:
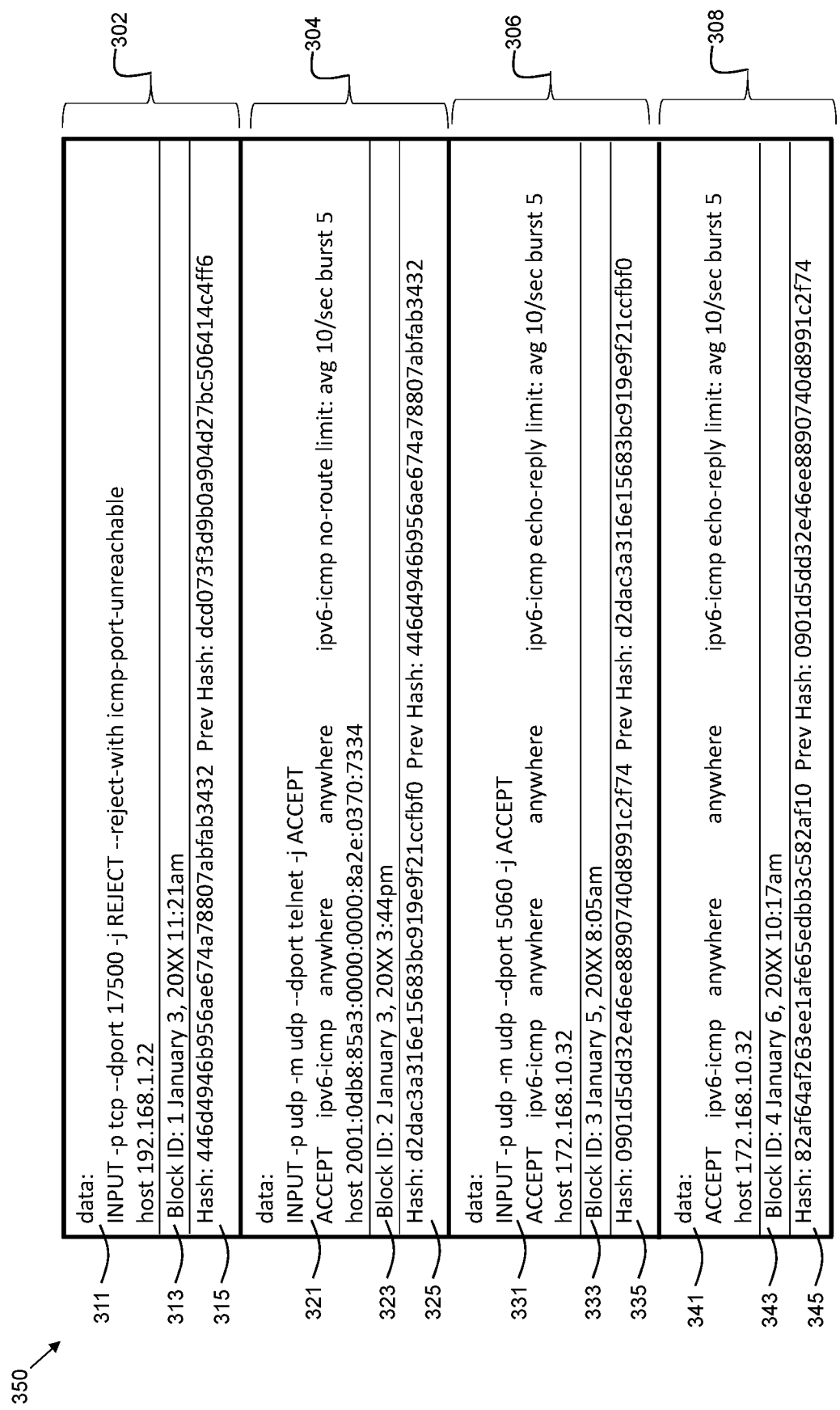
FIG. 3B shows exemplary blockchain data after a network topology change.

FIG. 3B shows exemplary blockchain information 350 after a network topology change. In some embodiments, it is determined that a new configuration is required due to the network topology change. In response to that determination, a blockchain block is created, wherein the blockchain block contains the new configuration. The blockchain block is added to a network blockchain.

As can be seen in FIG. 3B, blocks 302, 304, and 306 (previously shown in FIG. 3A) are present with the addition of new block 308. Block 308 includes data 341, a block ID and timestamp at 343, and a hash block at 345 which contains a self hash and a previous hash. Data 341 includes a new firewall rule, indicative of a new configuration. Note that while FIG. 3A and FIG. 3B show firewall data, the other devices shown in FIG. 1A (routers, IP phones, switches) may also store relevant configuration data in the blockchain.

Figures 4, 5:
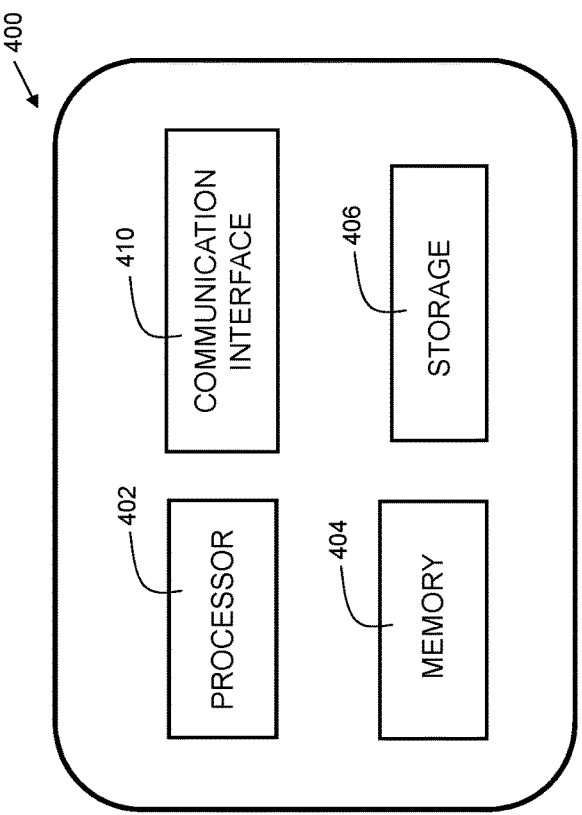
FIG. 4 is a block diagram in accordance with embodiments of the present invention.
FIG. 5 is a priority table in accordance with embodiments of the present invention.

FIG. 4 is a block diagram of a device 400 in accordance with embodiments of the present invention. Device 400 is an example of an electronic computing device that may be on a computer network and participate in a blockchain with other electronic computing devices on that network. Device 400 includes a processor 402, which is coupled to a memory 404. Memory 404 may include dynamic random access memory (DRAM), static random access memory (SRAM), magnetic storage, and/or a read only memory such as flash, EEPROM, optical storage, or other suitable memory. In some embodiments, the memory 404 may not be a transitory signal per se. Memory 404 stores instructions, which when executed by the processor, implement the steps of the present invention.

Device 400 may further include storage 406. In embodiments, storage 406 may include one or more magnetic storage devices such as hard disk drives (HDDs). Storage 406 may additionally include one or more solid state drives (SSDs).

The device 400 further includes a communication interface 410. The communication interface 410 may be a wired communication interface that includes Ethernet, Gigabit Ethernet, or the like. In embodiments, the communication interface 410 may include a wireless communication interface that includes modulators, demodulators, and antennas for a variety of wireless protocols including, but not limited to, Bluetooth™, Wi-Fi, and/or cellular communication protocols for communication over a computer network.

FIG. 5 is a priority table 500 in accordance with embodiments of the present invention. A priority table specifies a priority for various device classes on a network. The blockchain network and members are defined and a network administrator can select the infrastructure priority based on the priority of the devices in the environment. For this, a table of priorities like the example shown is built. These priorities can be used in determining which node on a network gets to add the next block to the blockchain.

In the example, there are three columns—Priority 502, device column 504, and device column 506. There are multiple rows, including row 1 512, which includes "firewall" in the device 504 column. Row 2 514 includes "router" in device column 504 and "load balancer" in device column 506. Row 3 516 includes "switch" in device column 504 and "hypervisor" in device column 506. Row 4 518 includes "IP Phone" in device column 504. Row 5 520 includes "Server" in device column 504, and row 6 522 includes "host" in device column 504. In some cases, multiple device types may share a priority. For example, in row 514, both router and load balancer are of priority 2. In some alternative embodiments, each device type may have a unique priority.

In some embodiments, a default table of priorities is open upon boot so the systems can enter a compliant legacy infrastructure environment. As part of initialization, a dynamic optimization for infrastructure configuration is performed on each device to discover its own configuration and profiles. Next, directly attached nodes (devices) are discovered. Then, blockchain community neighbors and corresponding priority levels are discovered. An initial blockchain community certified configuration is run. Configuration change agreement attempts are defined (for example, four attempts or 60 seconds before aborting a change request). The first community configuration is then digitally signed.

When a device detects a network topology change, it executes a process according to embodiments of the present invention. Once the change is processed, the device sends a message to its peers using an infrastructure notification protocol (for example, SNMP, TR069, etc.) to indicate that there is a possible change and the nature of the change. A peer device receives the message and validates if the change is relevant for its own configuration. If the change is not relevant, the receiving device will drop the message. If instead the change is relevant, the receiving device will request details of the change. After the period of information exchange is finished, devices with possible changes will start a blockchain change request. If the device(s) with the highest priorities on the network approves changes (as shown on example priority table 500), based on their own configurations, a new blockchain community configuration is digitally signed, and devices can start processing the configuration change. The digitally signed configuration is stored for a configurable number of iterations.

In embodiments, if a configuration change is made, the device adds a new block to its device blockchain. A consensus notification is sent (i.e., multicasted) to the device's peers, and the device remains in listening mode to receive notifications from the other network devices in the blockchain community. In embodiments, an agreed upon blockchain listener port may be used for this purpose.

Accordingly, embodiments may include transmitting a notification of the detected network topology change to one or more remote nodes (devices). Embodiments may include automatically enabling the new configuration on a network device. The consensus process is performed, taking into account devices priority table of the network. If a high priority device does not make consensus about the network change, then a rollback of the change in configuration in device elements is performed.

Figure 6:
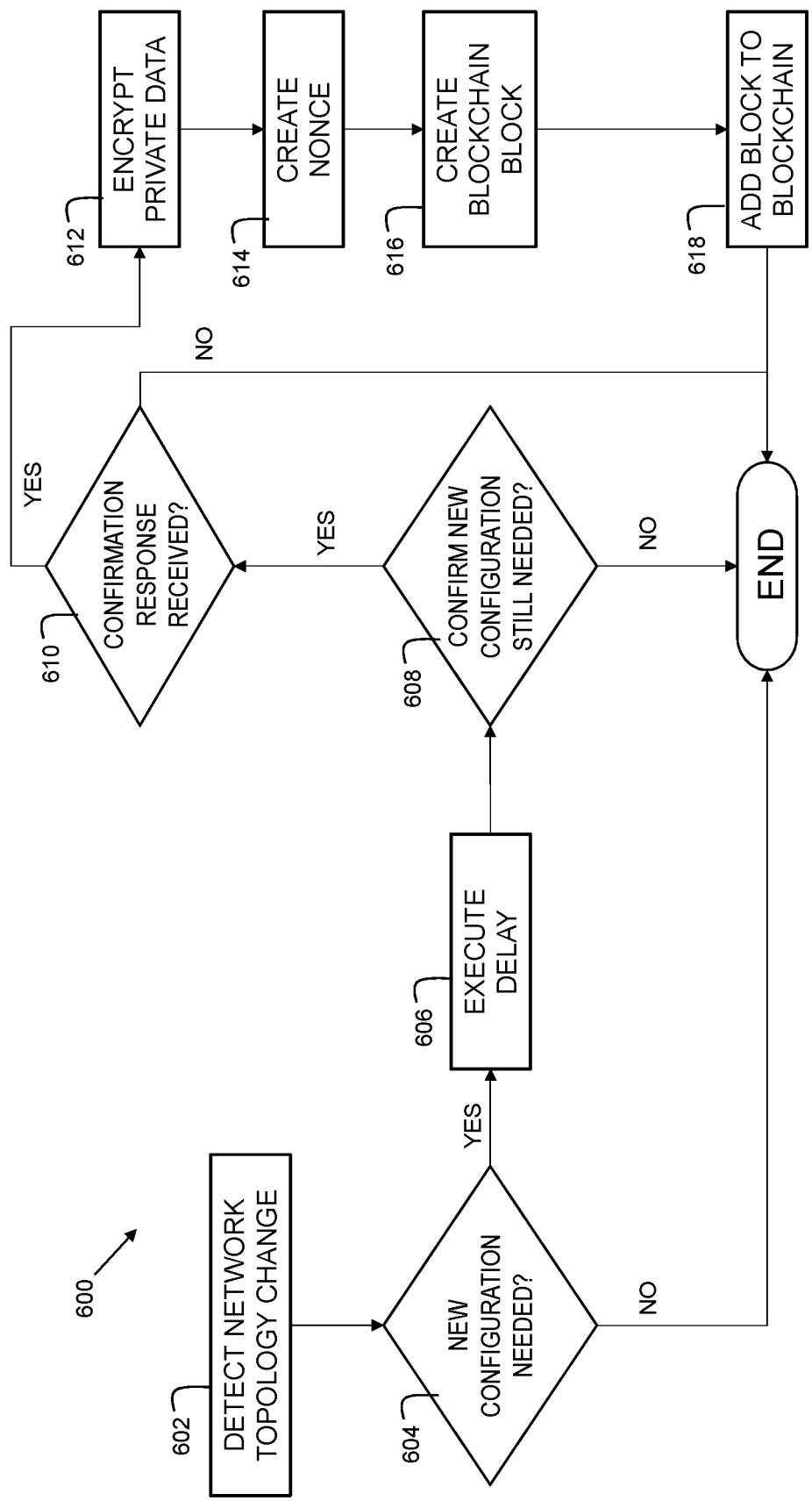
FIG. 6 is a flowchart illustrating steps for embodiments of the present invention.

FIG. 6 is a flowchart 600 illustrating steps for embodiments of the present invention. At 602, a network topology change is detected. This can include removal or addition of a network device. At 604, it is determined whether a new configuration is necessary. As an example, if a printer that uses a standard IP port goes offline, no configuration change may be required. However, if a device that uses a specific port range goes offline, and no other device on the network requires that port range, the firewall may be reconfigured to block that port range now that the device is removed for security purposes. If no new configuration is needed/required, the process ends.

If instead a new configuration is needed, then at 606, a delay is executed. The delay serves to filter out spurious events. As an example, if an IP phone is momentarily disconnected to move equipment, and then reconnected within a few minutes, it is not necessary to create a blockchain entry for that temporary condition. In this way, the size of the blockchain does not increase more rapidly than necessary. Thus, embodiments may include executing a predetermined delay duration (e.g., two minutes) after determining that a new configuration is needed. This is to check, for example, whether the change is temporary and will revert back before the end of the delay duration.

Following the delay execution, at 608, it is confirmed whether a new configuration is still necessary (after the delay). If not, then the process ends. This is indicative of a device that was briefly taken offline, and then put back online.

If instead it is confirmed that a new configuration is still needed, then at 610, it is determined whether a confirmation response is received. This can be an acknowledgement from a system administrator to confirm that the configuration change should take place. As an example, if an IP phone is removed, the system administrator may receive a message asking to confirm if he would like a firewall rule change as a result of the IP phone removal (e.g., to close the VoIP port). If no, then the process ends.

If instead yes, then private data is encrypted at 612. The private data can include configuration information that is important, but for which it is not desirable to expose the details to other devices. For example, it may not be desirable to expose all the port settings of the firewall to each device on the network. By encrypting some or all of the configuration data prior to storing it in the blockchain, it is possible to store the data in the blockchain, thereby creating an immutable record of the configuration without revealing the configuration details to the other devices on the network. Accordingly, embodiments may further include encrypting at least a portion of data corresponding to the new configuration prior to creating the blockchain block.

At 614, optionally, a nonce is appended to data corresponding to the new configuration prior to creating a blockchain block. The nonce is selected such that a hash value for the blockchain block is below a predetermined value. The nonce can be used to effectively slow down the growth of the blockchain, since it requires extra processing cycles to select a nonce that results in a hash that meets the predetermined value criterion. A blockchain block is created at 616, and the block is added to the blockchain at 618.

Figure 7:
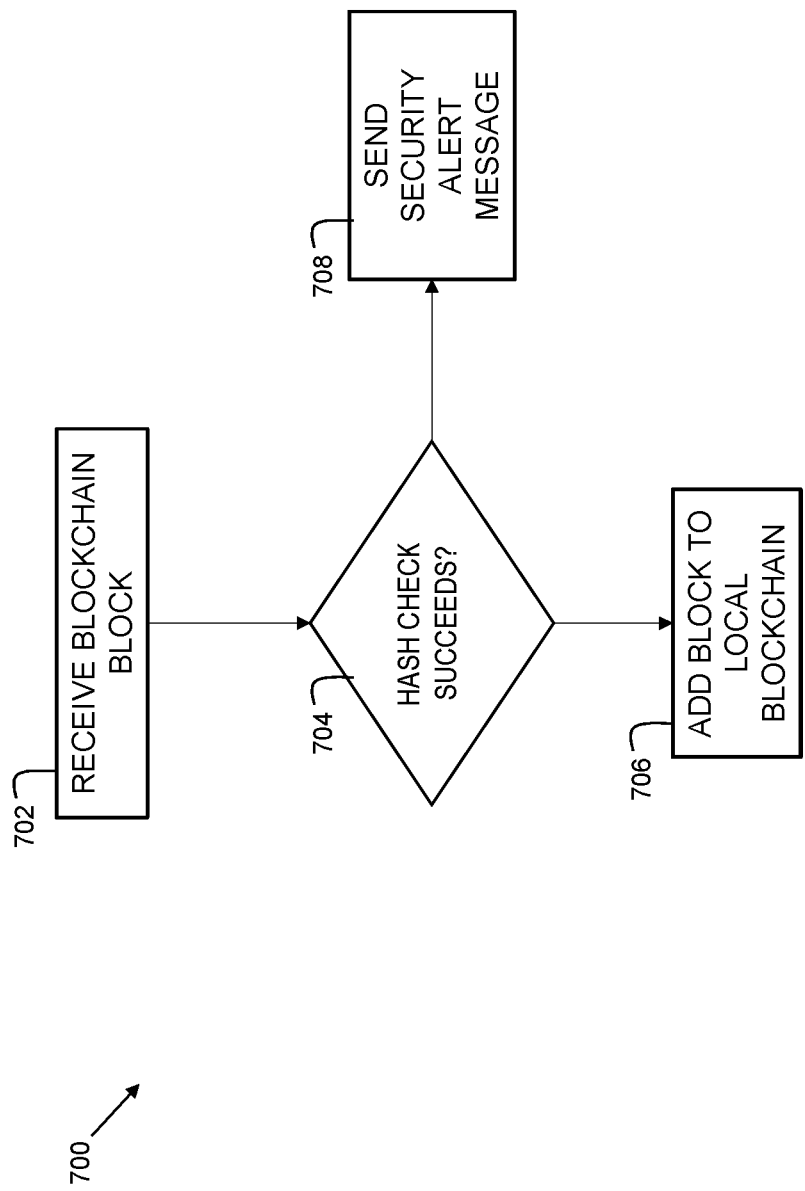
FIG. 7 is a flowchart illustrating steps for alternative embodiments of the present invention.

FIG. 7 is a flowchart 700 illustrating steps for alternative embodiments of the present invention. At 702, a blockchain block is received from a remote node. A hash check is then performed of the second blockchain block. At 704, it is determined whether a hash check succeeds. If yes, then at 706, the block is added to the local blockchain (the blockchain instance stored on the device). If not, at 708, a security alert message is sent to one or more remote nodes in response to a failure of the hash check. In this way, if blockchain data is altered by a malicious actor or data corruption, a security alert message can alert administrators (e.g., through an email or text message) about the condition.

FIG. 8 shows an exemplary user confirmation interface 800 in accordance with embodiments of the present invention. Embodiments may include providing a user confirmation interface for the new configuration; and in response to receiving a confirmation, enabling the new configuration on a network device. At 802, it is indicated that a network change is detected relating to an IP phone. It is specified that the device with the indicated IP address was removed. A query is included, which recites, "remove firewall rule?" Two options for user selection are presented. A user can select "yes" button 804 or "no" button 806 to provide instructions in response to the query. In some embodiments, a recommended action may be taken automatically, without prompting an administrator for confirmation. In such embodiments, a similar notification may be sent to the administrator, giving the administrator the option to undo the action if desired.

FIG. 9 shows an example 900 of a forensic record retrieval in accordance with embodiments of the present invention. At 902, there is a field in which a user can enter data for a configuration record sought to be retrieved. The record is then retrieved by the system and displayed on the user interface at 904. The retrieval can include scanning the blockchain to find the block with the latest timestamp that precedes the time entered in field 902, which indicates the configuration in effect at that time. The record includes a timestamp 906 and data record 908. As can be seen, the timestamp of the record is the record corresponding to block 306 (FIG. 3B). The audit trail capability can be useful in security investigation. It allows an administrator to quickly see what the network configuration was at a given point in time. The immutable nature of the blockchain also makes it more difficult for a malicious actor to hide actions such as temporary reduction in firewall security to enable a data breech. As another example, if it was known that information was stolen from a network, the configuration of the switches (106 and 120 of FIG. 1A) can be reviewed by checking the blockchain records to determine if any ports on the switch were set to a promiscuous mode to enable the data theft. If a malicious actor within the enterprise makes such a change temporarily for this purpose, it is recorded immutably in the blockchain, so it can be referred to at a later time. In this way, an authentic record regarding the network configuration at a given time can be retrieved and used for troubleshooting, forensics, and general recordkeeping of a configuration of a computer network.

As can now be appreciated, disclosed embodiments provide techniques for computer networks infrastructure automatic convergence. The novel use of a network blockchain for recording configurations of network devices improves network security by enabling a detailed recordkeeping of network configuration changes. Furthermore, forensic analysis of the network is improved since an authenticated record of the network transactions is available through the blockchain, providing an improved audit trail when necessary. Additionally, network disaster recovery can be improved due to easy retrieval of previous network configurations, allowing the restoration of previous settings in the event of a configuration change that causes network errors or degrades network performance.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for network convergence, comprising:
   detecting a network topology change;
   responsive to the detected network topology change, sending a message to peer devices on the network;
   determining if a new configuration is required due to the network topology change in response to each peer device validating whether the detected network topology change is relevant to a configuration of that peer device;
   in response to determining that a new configuration is required, executing a delay of a predetermined fixed time duration;
   check whether the detected network topology change reverts back before the end of the delay of the predetermined fixed time duration;
   when the detected network topology change does not revert back before the end of the delay of the predetermined fixed time duration, reconfirming that the new configuration is required;
   in response to the reconfirming that the new configuration is required after the delay, creating a blockchain block based on an approval from a prioritized device on the network, wherein the blockchain block contains the new configuration; and
   adding the blockchain block to a network blockchain.

2. The method of claim 1, further comprising transmitting a notification of the detected network topology change to one or more remote nodes.

3. The method of claim 1, further comprising automatically enabling the new configuration on a network device.

4. The method of claim 1, further comprising:
   providing a user confirmation interface for the new configuration; and
   in response to receiving a confirmation, enabling the new configuration on a network device.

5. The method of claim 1, further comprising encrypting at least a portion of data corresponding to the new configuration prior to creating the blockchain block.

6. The method of claim 1, further comprising:
   receiving a second blockchain block from a remote node;
   performing a hash check of the second blockchain block; and sending a security alert message to one or more remote nodes in response to a failure of the hash check, the security alert message comprising an email message or a text message.

7. The method of claim 1, further comprising:
appending a nonce to data corresponding to the new configuration prior to creating the blockchain block, wherein the nonce is selected such that a hash value for the blockchain block is below a predetermined value.

8. An electronic computing device comprising:
a processor;
a memory coupled to the processor, the memory containing instructions, that when executed by the processor, perform the steps of:
detecting a network topology change;
responsive to the detected network topology change, sending a message to peer devices on the network;
determining if a new configuration is required due to the network topology change in response to each peer device validating whether the detected network topology change is relevant to a configuration of that peer device;
in response to determining that a new configuration is required, executing a delay of a predetermined fixed time duration;
check whether the detected network topology change reverts back before the end of the delay of the predetermined fixed time duration;
when the detected network topology change does not revert back before the end of the delay of the predetermined fixed time duration, reconfirming that the new configuration is required;
in response to the reconfirming that the new configuration is required after the delay, creating a blockchain block based on an approval from a prioritized device on the network, wherein the blockchain block contains the new configuration; and
adding the blockchain block to a network blockchain.

9. The electronic computing device of claim 8, wherein the memory further comprises instructions, that when executed by the processor, perform the step of transmitting a notification of the detected network topology change to one or more remote nodes.

10. The electronic computing device of claim 8, wherein the memory further comprises instructions, that when executed by the processor, perform the step of automatically enabling the new configuration on the electronic computing device.

11. The electronic computing device of claim 8, wherein the memory further comprises instructions, that when executed by the processor, perform the step of encrypting at least a portion of data corresponding to the new configuration prior to creating the blockchain block.

12. The electronic computing device of claim 8, wherein the memory further comprises instructions, that when executed by the processor, perform the steps of:
receiving a second blockchain block from a remote node;
performing a hash check of the second blockchain block; and
sending a security alert message to one or more remote nodes in response to a failure of the hash check, the security alert message comprising an email message or a text message.

13. The electronic computing device of claim 8, wherein the memory further comprises instructions, that when executed by the processor, perform the step of:
appending a nonce to data corresponding to the new configuration prior to creating the blockchain block, wherein the nonce is selected such that a hash value for the blockchain block is below a predetermined value.

14. A computer program product for an electronic computing device comprising a computer readable hardware storage device having program instructions embodied therewith, the program instructions executable by a processor to cause the electronic computing device to:
detect a network topology change;
responsive to the detected network topology change, send a message to peer devices on the network;
determine if a new configuration is required due to the network topology change in response to each peer device validating whether the detected network topology change is relevant to a configuration of that peer device;
in response to determining that a new configuration is required, executing a delay of a predetermined fixed time duration;
check whether the detected network topology change reverts back before the end of the delay of the predetermined fixed time duration;
when the detected network topology change does not revert back before the end of the delay of the predetermined fixed time duration, reconfirm that the new configuration is required;
in response to the reconfirming that the new configuration is required after the delay, create a blockchain block based on an approval from a prioritized device on the network, wherein the blockchain block contains the new configuration; and
add the blockchain block to a network blockchain.

15. The computer program product of claim 14, wherein the computer readable hardware storage device includes program instructions executable by the processor to cause the electronic computing device to:
provide a user confirmation interface for the new configuration; and
in response to receiving a confirmation, enable the new configuration on a network device.

16. The computer program product of claim 14, wherein the computer readable hardware storage device includes program instructions executable by the processor to cause the electronic computing device to encrypt at least a portion of data corresponding to the new configuration prior to creating the blockchain block.

17. The computer program product of claim 14, wherein the computer readable hardware storage device includes program instructions executable by the processor to cause the electronic computing device to:
receive a second blockchain block from a remote node;
perform a hash check of the second blockchain block; and
send a security alert message to one or more remote nodes in response to a failure of the hash check, the security alert message comprising an email message or a text message.

* * * * *